United States Patent
Ikeda et al.

(10) Patent No.: US 9,623,731 B2
(45) Date of Patent: Apr. 18, 2017

(54) VEHICULAR RESIN BACK DOOR STRUCTURE

(71) Applicant: TOYOTA JIDOSHA KABUSHIKI KAISHA, Toyota-shi, Aichi-ken (JP)

(72) Inventors: Koki Ikeda, Toyota (JP); Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/945,772

(22) Filed: Nov. 19, 2015

(65) Prior Publication Data

US 2016/0167492 A1    Jun. 16, 2016

(30) Foreign Application Priority Data

Dec. 15, 2014   (JP) .................................. 2014-252921

(51) Int. Cl.
| | | |
|---|---|---|
| *B60J 5/10* | (2006.01) | |
| *B60J 1/18* | (2006.01) | |
| *B60J 1/00* | (2006.01) | |
| B60J 5/04 | (2006.01) | |

(52) U.S. Cl.
CPC .................. *B60J 5/10* (2013.01); *B60J 1/006* (2013.01); *B60J 1/18* (2013.01); *B60J 5/101* (2013.01); *B60J 5/107* (2013.01); *B60J 5/0481* (2013.01)

(58) Field of Classification Search
CPC ..... B60J 1/004; B60J 1/006; B60J 1/18; B60J 1/10; B60J 5/10; B60J 5/101; B60J 5/107; B60J 5/0481

USPC ......... 296/146.1–146.3, 146.5, 146.6, 146.8, 296/146.15, 201, 76, 56

See application file for complete search history.

(56) References Cited

U.S. PATENT DOCUMENTS

| | | | | |
|---|---|---|---|---|
| 4,261,610 A | * | 4/1981 | Inamoto ................... | B60J 5/101 296/146.2 |
| 4,709,957 A | * | 12/1987 | Ohya ..................... | B60H 1/265 296/146.3 |
| 4,773,700 A | * | 9/1988 | Sannomiya .............. | B60J 5/107 296/106 |
| 4,822,098 A | * | 4/1989 | Vogt ........................ | B60J 5/101 296/146.5 |
| 4,886,312 A | * | 12/1989 | Asoh ...................... | B60J 1/1884 296/146.2 |

(Continued)

FOREIGN PATENT DOCUMENTS

| | | |
|---|---|---|
| EP | 2653332 A2 | 10/2013 |
| JP | 2014-131896 A | 7/2014 |
| JP | 2014-189263 A | 10/2014 |

*Primary Examiner* — Gregory Blankenship
(74) *Attorney, Agent, or Firm* — Oliff PLC

(57) ABSTRACT

A vehicular resin back door structure includes an inner panel that is made of resin and defines a frame of a resin back door configured to be supported by a vehicle body, and that is formed with an opening through which a vehicle driver can view rearwardly at an upper portion of the inner panel; an outer panel that is made of resin and disposed at a periphery of the opening, and that is joined to the inner panel by a first adhesive to form, together with the inner panel, a frame section including an internal chamber; a glass sheet that is joined to the inner panel by a second adhesive; and a contact wall portion that forms part of a portion of the inner panel, and that directly or indirectly contacts the vehicle body in a closed state of the vehicular resin back door.

9 Claims, 10 Drawing Sheets

(56) References Cited

U.S. PATENT DOCUMENTS

| | | | | |
|---|---|---|---|---|
| 6,814,385 | B2* | 11/2004 | Fujiwara | B60J 10/70 296/146.15 |
| 7,828,365 | B2* | 11/2010 | Kiriakou | B60J 5/107 296/146.1 |
| 8,182,025 | B2* | 5/2012 | Auchter-Bruening | B60J 7/04 296/191 |
| 8,226,151 | B2* | 7/2012 | Miyake | B60J 5/101 296/106 |
| 2010/0156138 | A1* | 6/2010 | Terai | B60J 1/007 296/146.3 |
| 2010/0270827 | A1* | 10/2010 | Krachler | B60J 5/101 296/146.2 |
| 2011/0241376 | A1* | 10/2011 | Igura | B60J 5/101 296/146.3 |
| 2016/0075216 | A1* | 3/2016 | Kamimura | B60J 5/107 296/146.2 |
| 2016/0167492 | A1* | 6/2016 | Ikeda | B60J 5/10 296/146.2 |

\* cited by examiner

VEHICULAR RESIN BACK DOOR STRUCTURE

CROSS-REFERENCE TO RELATED APPLICATION

This application claims priority under 35 USC 119 from Japanese Patent application No. 2014-252921 filed on Dec. 15, 2014, the disclosure of which is incorporated by reference herein in its entirety.

BACKGROUND

Technical Field

Preferred embodiments relate to a vehicular resin back door structure.

Related Art

Japanese Patent Application Laid-Open (JP-A) No. 2014-131896 describes a vehicular resin back door structure in which an inner panel made of resin and an outer panel made of resin are joined together by an adhesive. To explain this vehicular resin back door structure simply, a bent portion is formed at a vehicle width direction inside end portion of the outer panel, and the bent portion is joined by adhesive to an inside wall of the inner panel. A vehicle width direction outside end portion of the outer panel is joined by adhesive to a flange portion of the inner panel. A closed cross-section is thereby formed by the inner panel and the outer panel. That is, once the inner panel and the outer panel are joined to each other, the inner and outer panels form a chamber that, when viewed in cross section, is surrounded on all sides by walls of the inner and outer panels.

However, there is room for improvement in the vehicular resin back door structure described above, with regard to the following point. In the vehicular resin back door structure described above, back window glass (a glass sheet) is joined by adhesive to a vehicle width direction outside end portion of the outer panel. An adhesive layer is thereby interposed between the flange portion of the inner panel and the back window glass at two locations, such that there is room for improvement with regard to stably supporting the back window glass.

SUMMARY

In consideration of the above circumstances, an object of preferred embodiments is to provide a vehicular resin back door structure capable of stably supporting a glass sheet.

A vehicular resin back door structure of a first aspect of the disclosure includes: an inner panel that is made of resin and defines a frame of a resin back door that is configured to be supported by a vehicle body so as to be capable of opening and closing, an upper portion of the inner panel having an opening through which a driver of the vehicle can view rearwardly out of the vehicle; an outer panel that is made of resin and disposed on a vehicle outer side of the inner panel at a periphery of the opening, the outer panel joined to the inner panel by a first adhesive to form, together with the inner panel, a frame section including an internal chamber; a glass sheet that is joined to the inner panel at the frame section by a second adhesive, and that covers the opening; and a contact wall that forms part of a portion of the inner panel at the frame section, and that is configured to directly or indirectly contact the vehicle body in a closed state of the vehicular resin back door.

In the vehicular resin back door structure of the first aspect, the frame of the vehicular resin back door, configured to be supported by the vehicle body so as to be capable of opening and closing, is configured by the inner panel made of resin, and the opening used for viewing rearwardly out of the vehicle is formed in the inner panel. The outer panel made of resin is disposed at the periphery of the opening on the vehicle outer side of the inner panel, and the outer panel is joined to the inner panel by the first adhesive. The frame section including the internal chamber is thereby formed at the periphery of the opening by the inner panel and the outer panel.

The glass sheet is joined to the vehicle outer side of the inner panel at the frame section by the second adhesive, and closes off (covers) the opening. Since the glass sheet is directly joined to the inner panel, the glass sheet can be directly supported by the inner panel that mainly secures the rigidity of the vehicular resin back door.

A part of the portion of the inner panel forming the frame section defines the contact wall portion, and the contact wall portion is configured to directly or indirectly contact the vehicle body. This enables load acting on the inner panel from the glass sheet (such as load acting on the inner panel due to the weight of the glass sheet itself) to be distributed to the vehicle body, while being distributed across the entire vehicular resin back door. This enables the glass sheet to be stably supported.

A vehicular resin back door structure of a second aspect of the disclosure further includes the frame section having a first joint section that faces the glass sheet and that joins the inner panel and the outer panel together, and a second joint section that is disposed closer to the opening than the first joint section and that joins the inner panel and the outer panel together; and the first joint section and the glass sheet are joined together by the second adhesive.

In the vehicular resin back door structure of the second aspect, the frame section includes the first joint section and the second joint section joining the inner panel and the outer panel to each other. Namely, the inner panel and the outer panel are joined together at two locations in the frame section, these two locations being the first joint section and the second joint section. The first joint section and the glass sheet are joined together by the second adhesive. Thus when an impact load, occurring when the vehicular resin back door is being closed, is input from the vehicle body to the inner panel, the impact load is distributed at the two locations that are the first joint section and the second joint section and transmitted to the outer panel, and is also transmitted to the glass sheet through the second adhesive. This enables impact load occurring during opening and closing of the vehicular resin back door to be effectively distributed.

A vehicular resin back door structure of a third aspect of the disclosure further includes the first joint section having an inner side flange portion that is provided at the inner panel and extends outwardly of the chamber, and an outer side flange portion that is provided at the outer panel, that extends outwardly of the chamber, and that is joined to the inner side flange portion; and an extension portion extending further outwardly of the chamber than the outer side flange portion is formed at a portion at a leading end side of the inner side flange portion, and the glass sheet is joined to the extension portion by the second adhesive.

In the vehicular resin back door structure of the third aspect, the first joint portion includes the inner side flange portion of the inner panel and the outer side flange portion of the outer panel, and the inner side flange portion and the outer side flange portion extend outwardly of the chamber. Namely, the first joint portion extends outwardly of the chamber. The extension portion extending further outwardly of the chamber than the outer side flange portion is formed at the portion at the leading end side of the inner side flange portion, and the glass sheet is joined to the extension portion by the second adhesive. This enables a location for disposing the second adhesive to be secured on the inner panel, while providing for a sufficiently long joint length of the first joint section.

A vehicular resin back door structure of a fourth aspect of the disclosure further includes the first joint section extending parallel to the glass sheet in a cross-section viewed along the length direction of the frame section.

In the vehicular resin back door structure of the fourth aspect, a high joint strength can be secured for the first adhesive at the first joint section between the inner panel and the outer panel, during opening and closing of the vehicular resin back door, for example. Namely, during opening and closing of the vehicular resin back door, load toward the vehicle inside acts on the first joint section from the glass sheet, and load along the glass surface acts on the first joint section from the glass sheet. The load along the glass surface forms a load in a direction of shear between the inner panel and the outer panel with respect to the first adhesive. The fourth aspect enables a higher joint strength to be secured for the first adhesive at the inner panel and the outer panel than in cases in which load acts in a peeling direction between the inner panel and the outer panel with respect to the first adhesive. This enables a high joint strength to be secured for the first adhesive at the first joint portion between the inner panel and the outer panel during opening and closing of the vehicular resin back door.

A vehicular resin back door structure of a fifth aspect of the disclosure is any one of the second aspect to the fourth aspect, wherein the second joint section extends along a vehicle up-down direction in a cross-section viewed along the length direction of the frame section.

In the vehicular resin back door structure of the fifth aspect, a high joint strength can be secured for the first adhesive at the second joint section between the inner panel and the outer panel in a state in which the frame section supports the glass sheet. Namely, since the second joint section extends along the vehicle up-down direction in cross-section viewed along the length direction of the frame section, due to the weight of the glass sheet itself, a load in a direction of shear between the inner panel and the outer panel acts on the first adhesive of the second joint section. This enables a higher joint strength to be secured for the first adhesive at the second joint section between the inner panel and the outer panel than in cases in which load acts in a peeling direction between the inner panel and the outer panel with respect to the first adhesive. This enables a high joint strength to be secured for the first adhesive at the second joint section between the inner panel and the outer panel, in the state in which the frame section supports the glass sheet.

A vehicular resin back door structure of a sixth aspect of the disclosure is any one of the third aspect to the fifth aspect, wherein the second adhesive is disposed along both side edge portions in a vehicle width direction of the glass sheet, and both end portions in the vehicle width direction of the glass sheet are joined to the inner side flange portion.

In the vehicular resin back door structure of the sixth aspect, both end portions in the vehicle width direction of the glass sheet are joined to the inner side flange portion along both side edge portions in the vehicle width direction of the glass sheet, thereby enabling the glass sheet to be even more stably supported.

A vehicular resin back door structure of a seventh aspect of the disclosure is any one of the first aspect to the sixth aspect, wherein the second adhesive is disposed along an outer peripheral edge portion of the glass sheet around the entire periphery of the glass sheet, and an outer peripheral portion of the glass sheet is joined to the inner panel.

In the vehicular resin back door structure of the seventh aspect, the outer peripheral portion of the glass sheet is joined to the inner panel around the entire periphery of the glass sheet, thereby enabling the glass sheet to be even more stably supported in this case also.

A vehicular resin back door structure of a eighth aspect of the disclosure is the second aspect, wherein: the first joint section includes an inner side flange portion that is provided at the inner panel and that extends outwardly of the chamber, and an outer side flange portion that is provided at the outer panel, that extends outwardly of the chamber, and that is joined to the inner side flange portion; and the outer side flange portion has substantially the same length as the inner side flange portion, a hole is formed at the outer side flange portion, the inner side flange portion is exposed to the glass sheet through the hole, the second adhesive is disposed inside the hole, and the glass sheet is joined to the inner side flange portion through the hole.

The vehicular resin back door structure of the eighth aspect also enables a location for disposing the second adhesive to be secured on the inner panel, while securing the joint length of the first joint section.

A vehicular resin back door structure of a ninth aspect of the disclosure is the second aspect, wherein the first joint section is provided at an exterior of the chamber of the frame section and extends outwardly in the vehicle width direction.

The vehicular resin back door structure of the ninth aspect also enables a location for disposing the second adhesive to be secured on the inner panel, while securing the joint length of the first joint section.

A vehicular resin back door structure of a tenth aspect of the disclosure is the second aspect, wherein the first joint section is provided at the chamber of the frame section and extends inwardly in the vehicle width direction.

The vehicular resin back door structure of the tenth aspect also enables a location for disposing the second adhesive to be secured on the inner panel, while securing the joint length of the first joint section, and also enables the capacity of the chamber to be increased.

The vehicular resin back door structure of the first aspect enables the glass sheet to be stably supported.

The vehicular resin back door structure of the second aspect enables impact load occurring during opening and closing of the vehicular resin back door to be effectively distributed.

The vehicular resin back door structure of the third aspect enables a location for disposing the second adhesive to be secured on the inner panel, while securing the joint length of the first joint section.

The vehicular resin back door structure of the fourth aspect enables a high joint strength to be secured for the first adhesive at the first joint portion between the inner panel and the outer panel during opening and closing of the vehicular resin back door.

The vehicular resin back door structure of the fifth aspect enables a high joint strength to be secured for the first adhesive at the second joint section between the inner panel and the outer panel, in the state in which the frame section supports the glass sheet.

The vehicular resin back door structure of the sixth aspect and the seventh aspect enables the glass sheet to be even more stably supported.

The vehicular resin back door structure of the eighth aspect to the tenth aspect enables a location for disposing the second adhesive to be secured on the inner panel, while securing the joint length of the first joint section.

BRIEF DESCRIPTION OF THE DRAWINGS

Preferred embodiments will be described in detail based on the following figures, wherein.

DETAILED DESCRIPTION

Explanation follows regarding a vehicular resin back door 12 (hereafter simply referred to as back door (or rear hatch) 12) applied with a vehicular resin back door structure 10 according to an exemplary embodiment, with reference to the drawings. Note that in each of the drawings as appropriate, the arrow FR indicates the vehicle front side, and the arrow UP indicates the vehicle upper side, of a vehicle (automobile) applied with the back door 12. The arrow OUT indicates the vehicle width direction outside.

Figure 2:
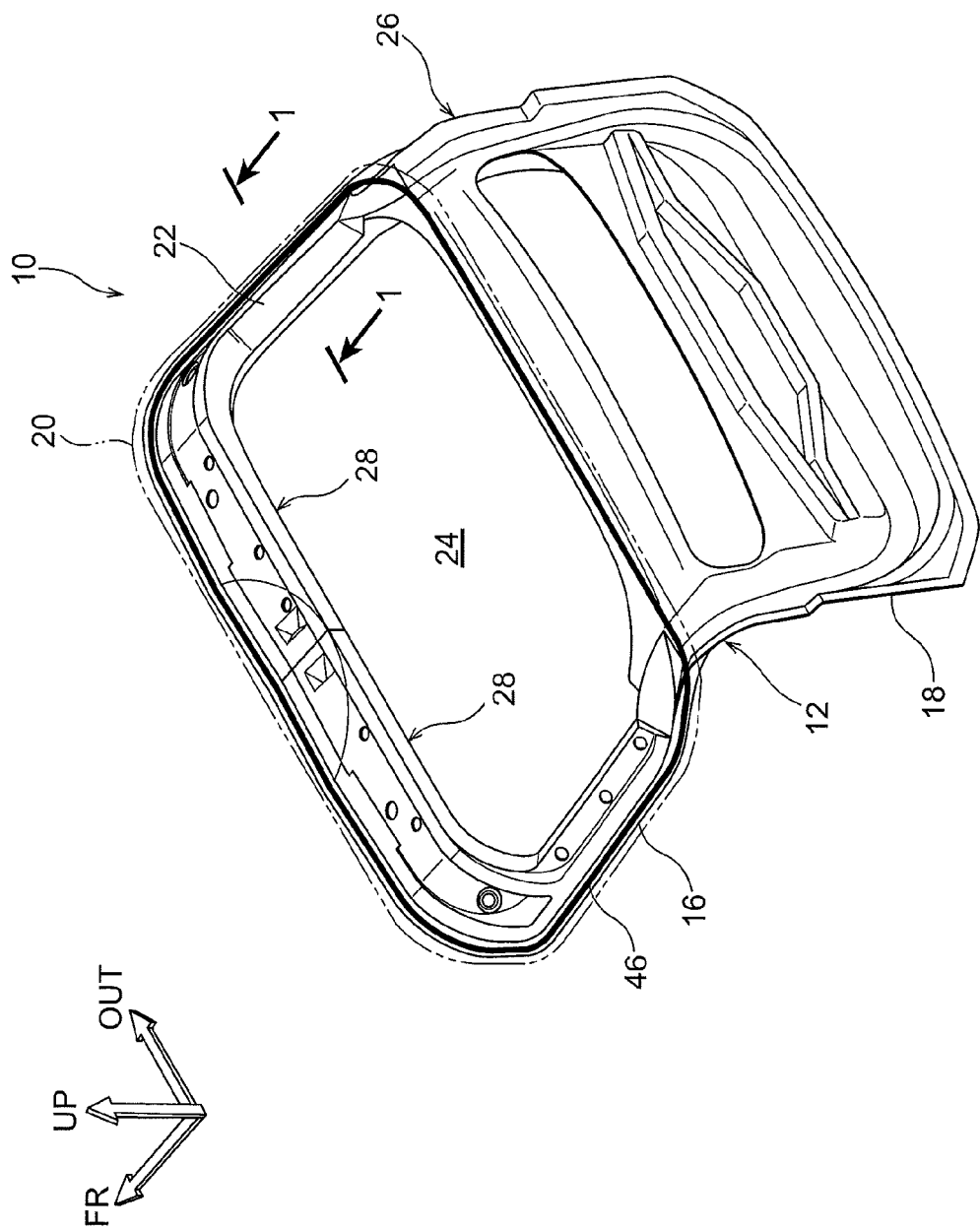
FIG. 2 is perspective view schematically illustrating the entire vehicular resin back door structure illustrated in FIG. 1, viewed from the vehicle rear side.

FIG. 2 is a perspective view illustrating the back door 12 viewed diagonally from the rear left side. As illustrated in FIG. 2, the back door 12 is provided at the rear end section of the vehicle. An upper end portion of the back door 12 is joined by hinges to a vehicle body with its axial direction along the vehicle width direction, and the back door 12 is supported by the vehicle body so as to be capable of opening and closing.

The back door 12 is formed substantially L-shaped in a vehicle side view, and is configured by a door upper section 16 extending with a gentle slope from the upper end portion of the back door 12 toward the vehicle rear side, and a door lower section 18 hanging down from a rear end portion of the door upper section 16 toward the vehicle lower side. Detailed explanation follows regarding the door upper section 16, installed with rear window glass 20.

The door upper section 16 includes a frame section 22 configured in a substantially rectangular frame shape. An opening 24, used by a driver to view rearwardly out of the vehicle rear, is formed inside the frame section 22. The rear window glass 20, serving as a glass sheet closing off (covering) the opening 24 from the vehicle outside, is provided at the door upper section 16, and the rear window glass 20 is supported by the frame section 22. The rear window glass 20 is formed in a substantially rectangular flat plate shape curving gently toward the vehicle outside.

Figure 1:
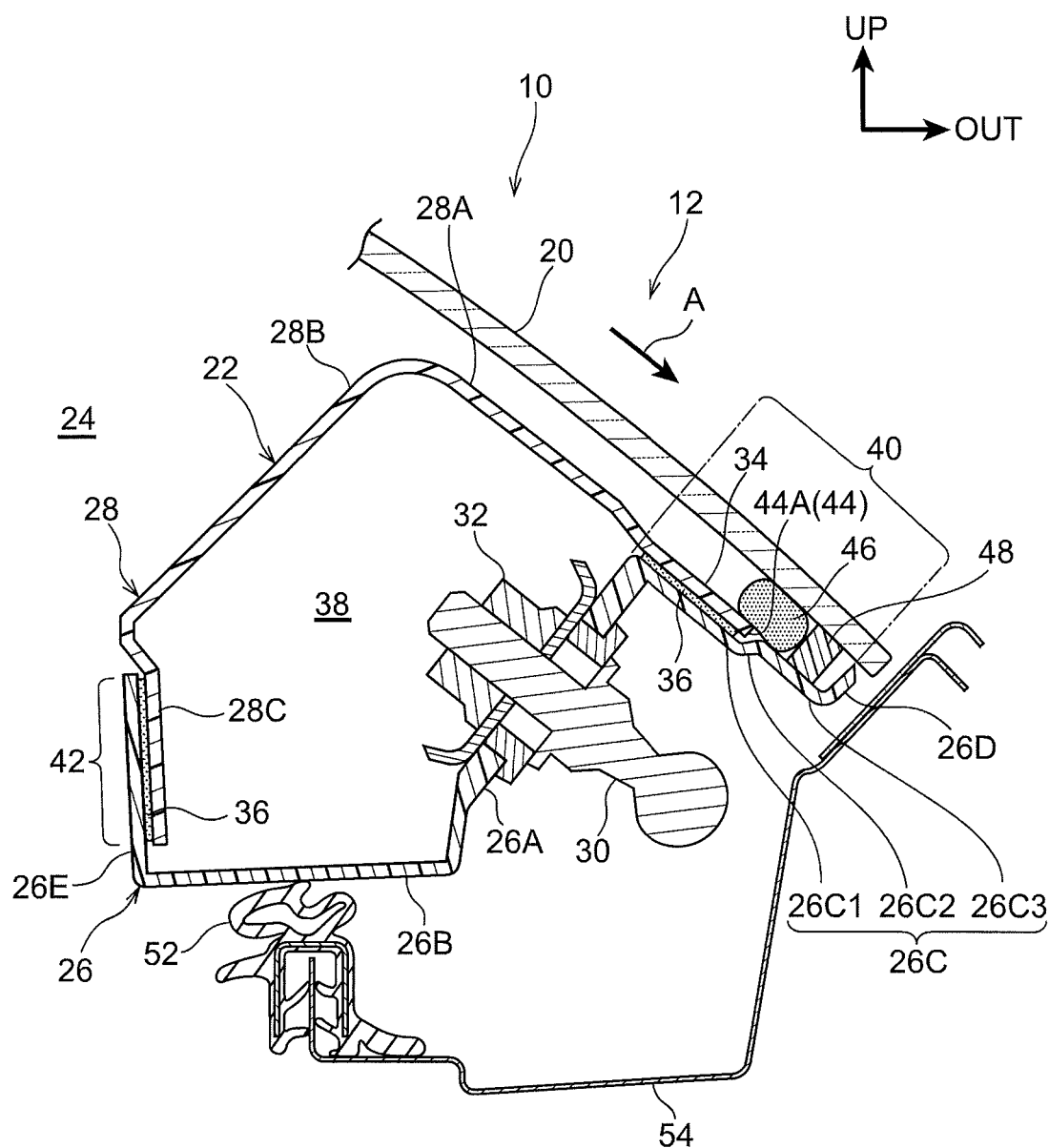
FIG. 1 is a cross-section (an enlarged cross-section taken along line 1-1 in FIG. 2) viewed along the length direction of a frame section of a vehicular resin back door having a vehicular resin back door structure according to an exemplary embodiment.

FIG. 1 is a cross-section of a side portion of the frame section 22, cut away along the vehicle width direction. The frame section 22 is configured by a door inner panel 26 serving as an inner panel disposed at the vehicle inside, and door outer panels 28 serving as outer panels disposed at the vehicle outside. Both the door inner panel 26 and the door outer panels 28 are made of resin. Specifically, the door inner panel 26 and the door outer panels 28 are configured by carbon fiber reinforced plastic (CFRP).

Figure 3:
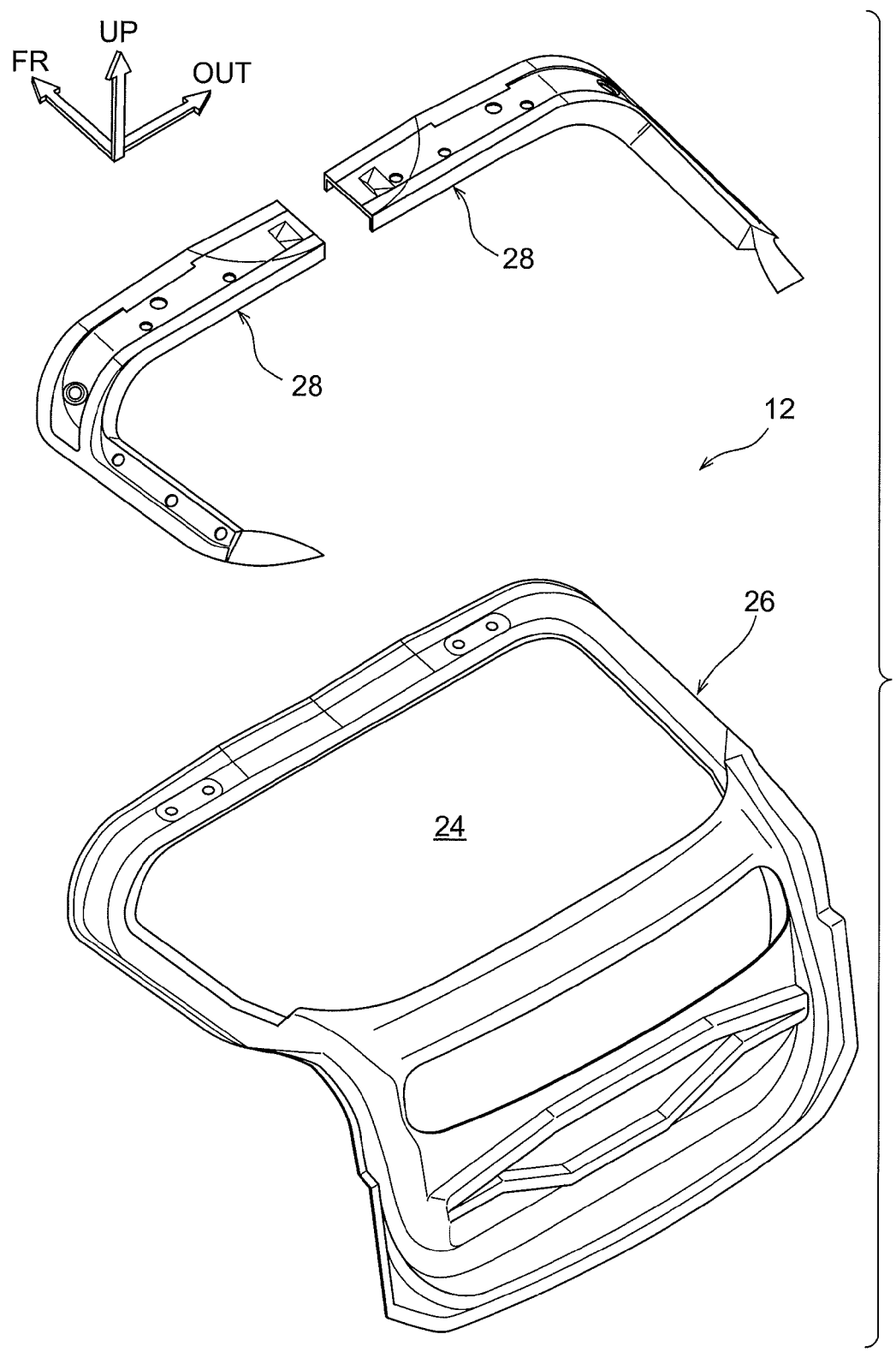
FIG. 3 is an exploded perspective view of door outer panels of the vehicular resin back door illustrated in FIG. 2, illustrated disassembled from a door inner panel.

As illustrated in FIG. 3, the door inner panel 26 is configured as a relatively large panel member forming the overall frame of the back door 12, and the opening 24 is formed at the door inner panel 26. The pair of left and right door outer panels 28 are disposed at the periphery of the opening 24. The pair of door outer panels 28 are configured with left-right symmetry to each other, and the door outer panels 28 are disposed at both vehicle width direction sides and the vehicle upper side of the opening 24. As described above, the frame section 22 is configured by the door outer panels 28 and the door inner panel 26. The back door 12 is thereby configured such that the rigidity of the back door 12 is mainly secured by the door inner panel 26. A lower portion of the door inner panel 26 is covered from the vehicle outside by a lower outer panel or the like, not illustrated in the drawings.

Returning to FIG. 1, each door outer panel 28 is configured by an outer upper wall portion 28A disposed parallel to the rear window glass 20, an outer side wall portion 28B bending in substantially a right angle from a vehicle width direction inside end portion of the outer upper wall portion 28A in a direction away from the rear window glass 20, and an outer lower wall portion 28C bending in an obtuse angle from an extension direction side end portion of the outer side wall portion 28B toward the vehicle lower side.

The door inner panel 26 includes an inner side wall upper portion 26A disposed further toward the vehicle width direction outside than the outer side wall portion 28B and disposed parallel to the outer side wall portion 28B, and an inner side wall lower portion 26B serving as a "contact wall portion" extending in an L-shape from a vehicle lower side end portion of the inner side wall upper portion 26A. The inner side wall upper portion 26A extends as far as the outer upper wall portion 28A, then bends toward the vehicle width direction outside, configuring an inner side flange portion 26C. A vehicle width direction outside end portion of the inner side flange portion 26C bends toward the rear window glass 20 side in substantially a right angle, configuring an outer end portion 26D. The inner side wall lower portion 26B extends as far as the outer lower wall portion 28C, then bends toward the vehicle upper side, configuring an inner lower wall portion 26E.

Note that a ball joint 30 of a damper stay, not illustrated in the drawings, formed with a male thread at a leading end portion, is fastened (fixed) to the inner side wall upper portion 26A using a nut 32. The inner side wall upper portion 26A is accordingly formed with a thicker plate thickness than other locations. In a closed state of the back door 12, a weather strip 52, attached to a vehicle body 54, is in contact with the inner side wall lower portion 26B. In this state, the weather strip 52 is pressed by the inner side wall lower portion 26B and undergoes resilient deformation. The inner side wall lower portion 26B is in contact with the vehicle body 54 through the weather strip 52 in this manner. Note that although the weather strip 52 is attached to the vehicle body 54 as described above, the weather strip 52 may be integrally formed to the door inner panel 26 (inner side wall lower portion 26B). In such cases, the inner side wall lower portion 26B is in direct contact with the vehicle body 54 through the weather strip 52.

Note that the outer upper wall portion 28A described above extends along the rear window glass 20 substantially straight along the vehicle width direction. A vehicle width direction outside portion of the outer upper wall portion 28A (specifically, a portion that extends toward the vehicle width direction outside of a closed cross-section portion (chamber) 38, described later) configures an outer side flange portion 34.

The inner side flange portion 26C described above is configured by an inner side joint portion 26C1 overlapping the outer side flange portion 34, and an extension portion 26C3 extending from a vehicle width direction outside end portion of the inner side joint portion 26C1, through a step portion 26C2, toward the vehicle width direction outside (a leading end side of the inner side flange portion 26C). The height of the step portion 26C2 is set substantially the same as a dimension of the thickness of a cured structural adhesive 36, described below, added to the plate thickness of the outer side flange portion 34. Thus in a state in which the outer side flange portion 34 is joined to the inner side joint portion 26C1, the surfaces of both portions are positioned in the same planar face (in the same plane).

The structural adhesive 36, serving as a first adhesive, is applied to the inner side joint portion 26C1 described above and the outer side flange portion 34 is superimposed thereon, thereby joining the outer side flange portion 34 to the inner side flange portion 26C (inner side flange portion 26C1). Similarly, the outer lower wall portion 28C is joined to the inner lower wall portion 26E using the structural adhesive 36. The closed cross-section portion (chamber) 38 is thereby formed at the interior of the frame section 22 by the door inner panel 26 and the door outer panels 28. That is, closed cross-section portion 38 is an internal chamber formed by door inner panel 26 and door outer panels 28. Note that a high-strength, low elongation two component liquid urethane-based adhesive, for example, may be employed as the structural adhesive 36.

The inner side flange portion 26C (inner side joint portion 26C1) of the frame section 22 and a portion of the outer side flange portion 34 configure a first joint section 40. The first joint section 40 is disposed at the exterior of the closed cross-section portion (chamber) 38, specifically at the vehicle width direction outside (the opposite side to the opening 24) of the closed cross-section portion (chamber) 38, and extends parallel to the rear window glass 20. A portion of the frame section 22 at the outer lower wall portion 28C and the inner lower wall portion 26E configures a second joint section 42, and the second joint section 42 is disposed at the vehicle width direction inside (the opening 24 side) of the first joint section 40. The second joint section 42 extends along the vehicle up-down direction, and is configured as a wall section partitioning the interior and exterior of the closed cross-section portion (chamber) 38.

In a state in which the outer side flange portion 34 is joined to the inner side flange portion 26C, a gap 44 is formed at a seam between the inner side flange portion 26C and the outer upper wall portion 28A. An end 44A of the gap 44 is positioned between a leading end portion of the outer side flange portion 34 and the step portion 26C2 of the inner side flange portion 26C. A peripheral component adhesive 46, serving as a second adhesive, is disposed so as to close off the end 44A of the gap 44. Three components, these being the extension portion 26C3 of the inner side flange portion 26C, the outer side flange portion 34, and the rear window glass 20, are joined together by the peripheral component adhesive 46.

Specifically, the peripheral component adhesive 46 is disposed along both side edge portions in a vehicle width direction of the rear window glass 20, and both side end portions in the vehicle width direction of the rear window glass 20 are joined to the inner side flange portion 26C. The rear window glass 20 is thereby directly joined to the extension portion 26C3 of the door inner panel 26, and supported by the frame section 22. As illustrated by the bold lines in FIG. 2, the peripheral component adhesive 46 is also disposed along an upper edge portion and a lower edge portion of the rear window glass 20, and an upper end portion and a lower end portion of the rear window glass 20 are joined to the door inner panel 26. Namely, an outer peripheral portion of the rear window glass 20 is joined around the entire periphery of the rear window glass 20 to the door inner panel 26 using the peripheral component adhesive 46. A one component urethane-based adhesive, for example, may be employed as the peripheral component adhesive 46.

The peripheral component adhesive 46 has a higher water resistance than the structural adhesive 36. Testing of high or low water resistance is performed according to JIS K6850 (Adhesives: Determination of tensile lap-shear strength of rigid-to-rigid bonded assemblies). Specifically, two test pieces (for example, of 25 mm in width, 200 mm in length, and 0.8 mm in height), equivalent to a first panel and a second panel, are prepared, and the test pieces are joined together with a joint overlap of 10 mm using the adhesive subject to test. The adhered test pieces are then immersed in warm water of a specific temperature (such as 60° C.) for a specific duration (such as 10 days), after which tensile water resistance testing (tensile shear testing) is performed at room temperature. After testing is complete, the generated load when breaking of the joined test pieces occurred and the state of damage thereof are checked, and the degree of water resistance is determined based on this. For a given generated load, the assumed input load differs according to the component used (component application), such that no single determination can be made; however determination can be established (per manufacturer) as long as the components used are determined. There are three types of damaged states. If interface damage, in which damage occurs to an interface between either of the test pieces and the adhesive, occurs, then water resistance is evaluated to be low. However, if cohesion failure, in which the adhesive itself is damaged, as well as material damage in which one of the test pieces themselves are damaged, occurs, then water resistance is evaluated to be high. When the high-strength, low elongation two component urethane-based adhesive, given as an example of the structural adhesive 36, is employed to adhere the two test pieces to each other, interface peeling occurs. Thus the water resistance of the high-strength, low elongation two component urethane-based adhesive is evaluated to be low. In contrast thereto, when the one component urethane-based adhesive, given as an example of the peripheral component adhesive 46, is employed to adhere the test pieces to each other, cohesion failure occurs. Thus the water resistance of the one component urethane-based adhesive is evaluated to be high.

A dam member 48 (a waterproofing member) is provided disposed at the extension portion 26C3 so as to be adjacent to the vehicle width direction outside of the peripheral component adhesive 46. The dam member 48 thereby seals between the extension portion 26C3 and the rear window glass 20. Note that an upper portion of the frame section 22 illustrated in FIG. 2 is similarly configured to the above configuration.

Explanation next follows regarding operation and advantageous effects of the present exemplary embodiment.

In the back door 12 configured as described above, the frame section 22 supporting the rear window glass 20 is configured by the door inner panel 26 and the door outer panels 28. Specifically, the inner side flange portion 26C of the door inner panel 26 and the outer side flange portion 34 of each door outer panel 28 are joined together by the structural adhesive 36, forming the first joint section 40 of the frame section 22. The outer lower wall portion 28C of each door outer panel 28 and the inner lower wall portion 26E of the door inner panel 26 are joined together by the structural adhesive 36, forming the second joint section 42 of the frame section 22. The frame section 22 forms a closed cross-section structure including the closed cross-section portion (chamber) 38 at the interior.

The rear window glass 20 is joined to the door inner panel 26 configuring the frame section 22 by the peripheral component adhesive 46, and the opening 24 is closed off from the vehicle width direction outside. Specifically, the rear window glass 20 is directly joined to the extension portion 26C3 of the inner side flange portion 26C of the door inner panel 26 by the peripheral component adhesive 46. Since the rear window glass 20 is directly joined to the door inner panel 26, the rear window glass 20 can be directly supported by the door inner panel 26 that mainly secures the rigidity of the back door 12.

The inner side wall lower portion 26B of the door inner panel 26 contacts the vehicle body 54 through the weather strip 52. This enables load from the rear window glass 20 acting on the door inner panel 26 (such as load acting on the door inner panel 26 due to the weight of the rear window glass 20 itself, or load from the rear window glass 20 toward the vehicle inside acting on the door inner panel 26 when the back door 12 is being closed) to be distributed to the vehicle body 54, while also being distributed across the entire back door 12. This enables the rear window glass 20 to be stably supported.

In the present exemplary embodiment, since the rear window glass 20 is directly joined to the door inner panel 26, configuration is such that a single adhesive layer, formed by the peripheral component adhesive 46, is interposed between the rear window glass 20 and the door inner panel 26. This enables the rear window glass 20 to be stably joined and enables the rigidity of the back door 12 to be increased, compared to a configuration in which two adhesive layers are interposed between an inner panel and a glass sheet, as in technology hitherto.

The frame section 22 also includes the first joint section 40 and the second joint section 42 that joint together the door inner panel 26 and each door outer panel 28 as described above. Namely, in the frame section 22, the door inner panel 26 and the door outer panel 28 are joined together at joint sections in two locations, these being the first joint section 40 and the second joint section 42. The rear window glass 20 is joined to the extension portion 26C3 of the inner side flange portion 26C at the first joint section 40 by the peripheral component adhesive 46. Thus when an impact load, occurring during opening and closing of the back door 12 (mainly when the back door 12 is being closed), is input from the vehicle body 54 to the door inner panel 26 configuring the frame section 22, the impact load is distributed at the two locations that are the first joint section 40 and the second joint section 42 and transmitted to the door outer panel 28, and is also transmitted to the rear window glass 20 through the first joint section 40. This enables the impact load to be effectively distributed, while suppressing stress from concentrating at the joint sections between the door inner panel 26 and the door outer panel 28, during opening and closing of the back door 12. This enables impact resistance to be improved during opening and closing of the back door 12, for example, and enables opening and closing durability of the back door 12 to be improved.

The first joint section 40 is configured including the inner side flange portion 26C and the outer side flange portion 34, and the inner side flange portion 26C and the outer side flange portion 34 extend toward the vehicle width direction outside of the closed cross-section portion (chamber) 38. The extension portion 26C3 is formed at a portion at the leading end side of the inner side flange portion 26C, and the extension portion 26C3 extends further toward the vehicle width direction outside than the outer side flange portion 34. The rear window glass 20 is joined to the extension portion 26C3 by the peripheral component adhesive 46. This enables a location for disposing the peripheral component adhesive 46 to be secured on the door inner panel 26, while securing the joint length of the first joint section 40.

The first joint section 40 extends parallel to the rear window glass 20. This enables a high joint strength to be secured for the structural adhesive 36 at the first joint section 40 between the inner side flange portion 26C and the outer side flange portion 34 during opening and closing of the back door 12. Namely, during opening and closing of the back door 12, load toward the vehicle inside acts on the first joint section 40 from the rear window glass 20, and load along the glass surface of the rear window glass 20 (see the arrow A in FIG. 1) acts on the first joint section 40 from the rear window glass 20. The load along the glass surface forms load in a direction of shear between the inner side flange portion 26C and the outer side flange portion 34 with respect to the structural adhesive 36. This enables a higher joint strength to be secured for the structural adhesive 36 at the inner side flange portion 26C and the outer side flange portion 34 than in cases in which load acts in a direction of peel between the inner side flange portion 26C and the outer side flange portion 34 with respect to the structural adhesive 36. This enables a high joint strength to be secured for the structural adhesive 36 at the first joint section 40 between the inner side flange portion 26C and the outer side flange portion 34 during opening and closing of the back door 12.

In a cross-section viewed along the length direction of the frame section 22, the second joint section 42 of the frame section 22 extends along the vehicle up-down direction. This enables a high joint strength to be secured for the structural adhesive 36 at the second joint section 42 between the inner lower wall portion 26E and the outer lower wall portion 28C, in a state in which the frame section 22 supports the rear window glass 20. Namely, since the second joint section 42 extends along the vehicle up-down direction, due to the weight of the rear window glass 20 itself, load in a direction of shear between the inner lower wall portion 26E and the outer lower wall portion 28C acts on the structural adhesive 36 of the second joint section 42. This enables a higher joint strength to be secured for the structural adhesive 36 at the second joint section 42 between the inner lower wall portion 26E and the outer lower wall portion 28C than in cases in which load acts in a direction of peel between the inner lower wall portion 26E and the outer lower wall portion 28C with respect to the structural adhesive 36. This enables a high joint strength to be secured for the structural adhesive 36 at the second joint section 42 between the inner lower wall portion 26E and the outer lower wall portion 28C, in the state in which the frame section 22 supports the rear window glass 20.

The second joint section 42 of the frame section 22 is configured as a wall section partitioning (separating) the interior and exterior of the closed cross-section portion (chamber) 38. This enables the surface area of the closed cross-section portion (chamber) 38 of the frame section 22 to be increased, and torsional rigidity and bending rigidity of the frame section 22 to be increased, in the door inner panel 26 and the door outer panels 28 configured by resin material.

Figure 10:
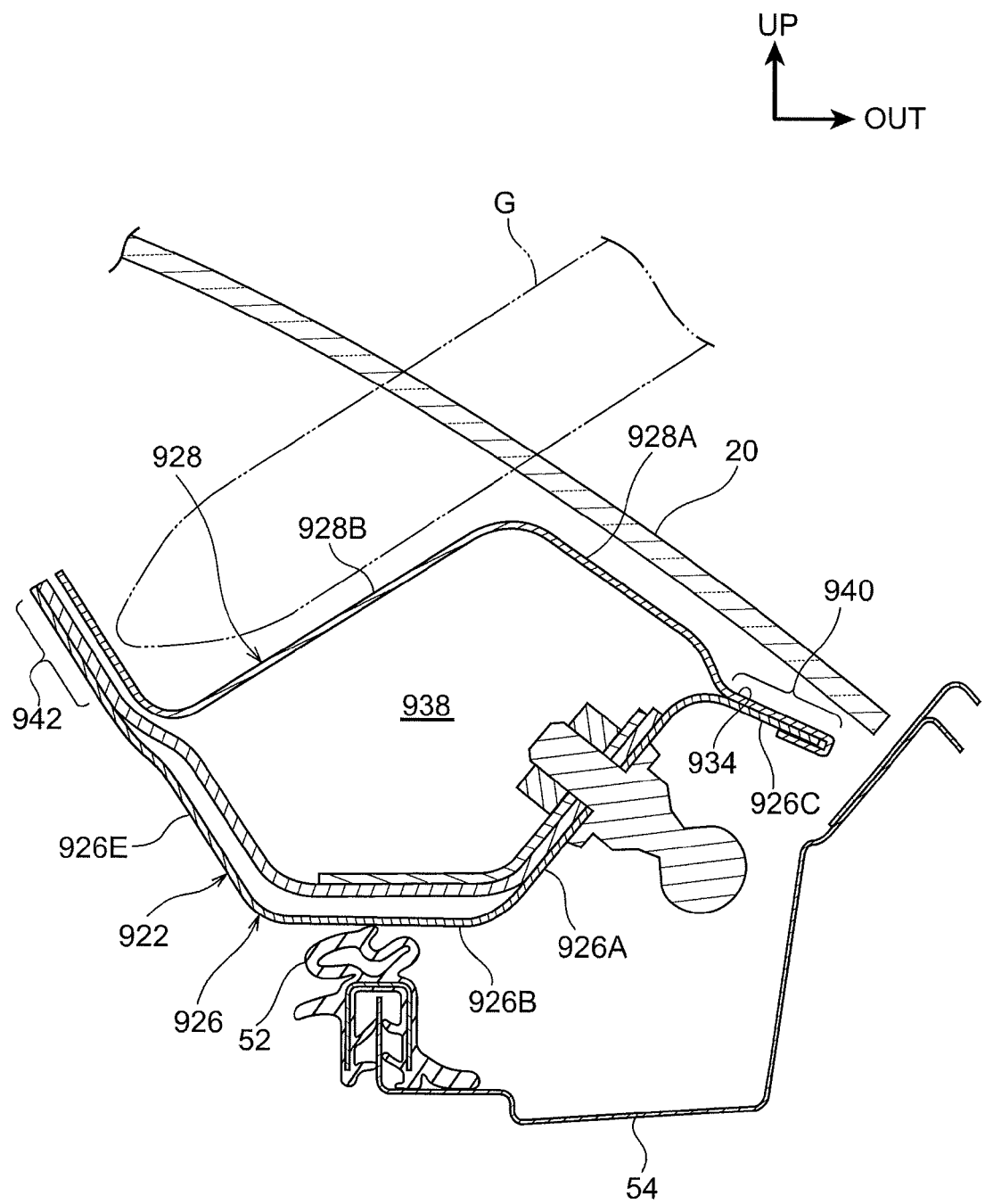
FIG. 10 is a cross-section corresponding to FIG. 1, illustrating a frame section of a back door of a Comparative Example.

Explanation follows regarding this point, with comparison to a back door configured by metal, as illustrated in FIG. 10. Since a door inner panel 926 and a door outer panel 928, illustrated in FIG. 10, are both made of metal, the door inner panel 926 and the door outer panel 928 need to be joined together by welding or the like. Thus in a Comparative Example, similarly to a first joint section 940, a joint section 942 corresponding to the second joint section 42 of the present specification is disposed at the exterior of a closed cross-section portion 938, and a weld gun G is used to make the joint. Placement space for the weld gun G therefore needs to be secured in the door inner panel 926 and door outer panel 928 that are made of metal, and the surface area of the closed cross-section portion (chamber) 938 is decreased proportionately.

In contrast thereto, in the present exemplary embodiment, the door inner panel 26 and the door outer panels 28 are configured by resin material, and the second joint section 42 of the frame section 22 configures the wall section partitioning the interior and exterior of the closed cross-section portion (chamber) 38. The surface area of the closed cross-section portion (chamber) 38 of the frame section 22 is therefore larger than in the Comparative Example, thereby enabling the torsional rigidity and bending rigidity of the frame section 22 to be increased.

The outer peripheral end portion of the rear window glass 20 is joined to the door inner panel 26 by the peripheral component adhesive 46 around the entire periphery of the rear window glass 20. This enables the rear window glass 20 to be even more stably supported.

Explanation next follows regarding variations to the structure of the first joint section 40, and the joint structure between the first joint section 40 and the rear window glass 20, in the present exemplary embodiment, with reference to FIG. 4 to FIG. 9. Note that FIG. 4 to FIG. 9 mainly illustrate variations in the structure of the first joint section 40, and so the overall shape of the frame section 22 is illustrated simplified as a substantially rectangular shape.

Variation 1

Figure 4:
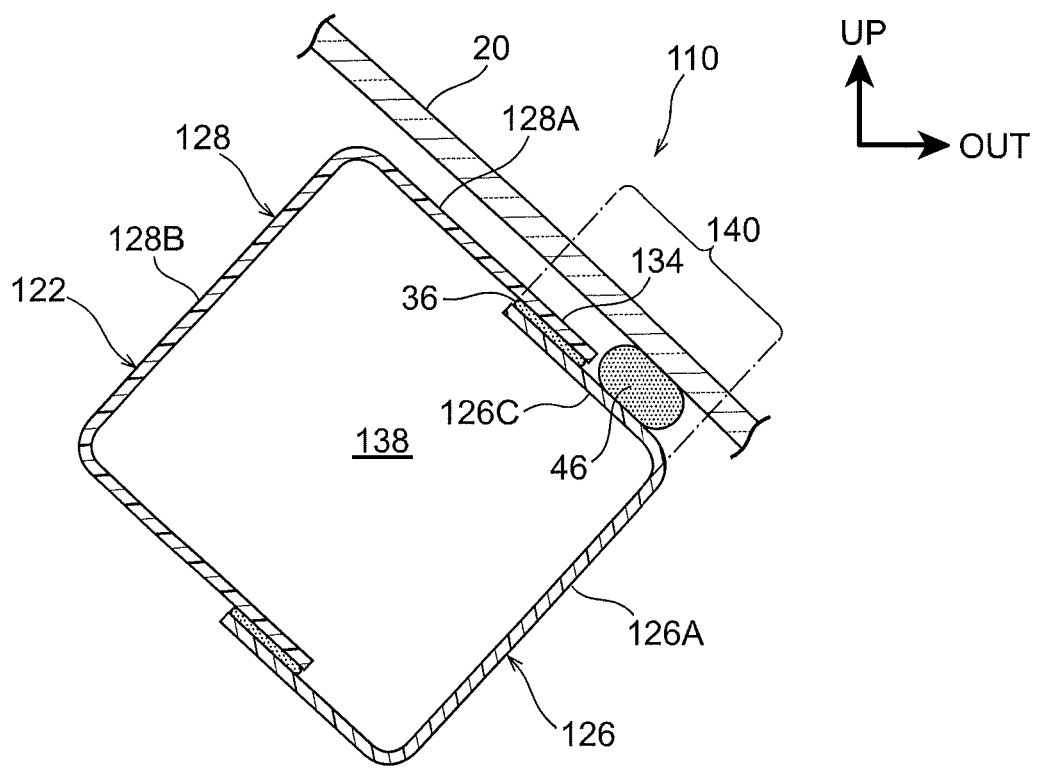
FIG. 4 is a cross-section illustrating a first variation of a structure of a first joint section, and a joint structure of the first joint section and rear window glass, of the frame section illustrated in FIG. 1.

As illustrated in FIG. 4, a variation 1 is configured similarly to the present exemplary embodiment, with the exception of the following points. In the variation 1, an inner side flange portion 126C of a door inner panel 126 bends toward the vehicle width direction inside of an inner side wall upper portion 126A, and is disposed substantially parallel to the rear window glass 20. An outer side flange portion 134 of a door outer panel 128 overlaps a portion at a leading end side of the inner side flange portion 126C at the vehicle outside of the inner side flange portion 126C. Namely, in the variation 1, the outer side flange portion 134 does not extend toward the vehicle width direction outside of a closed cross-section portion (chamber) 138, and a first joint section 140 is configured as a wall section partitioning between the interior and exterior of the closed cross-section portion (chamber) 138. The rear window glass 20 is directly joined to a portion at a base end side of the inner side flange portion 126C by the peripheral component adhesive 46. In other words, the rear window glass 20 is only joined to the door inner panel 126. Thus the rear window glass 20 is directly supported by the door inner panel 126 in the variation 1 also, thereby enabling the rear window glass 20 to be stably supported. Reference numerals 110, 122, 128, 128A and 128B represent structures similar to the structures associated with reference numerals 10, 22, 28, 28A and 28B, respectively, in FIG. 1.

Variation 2

Figure 5:
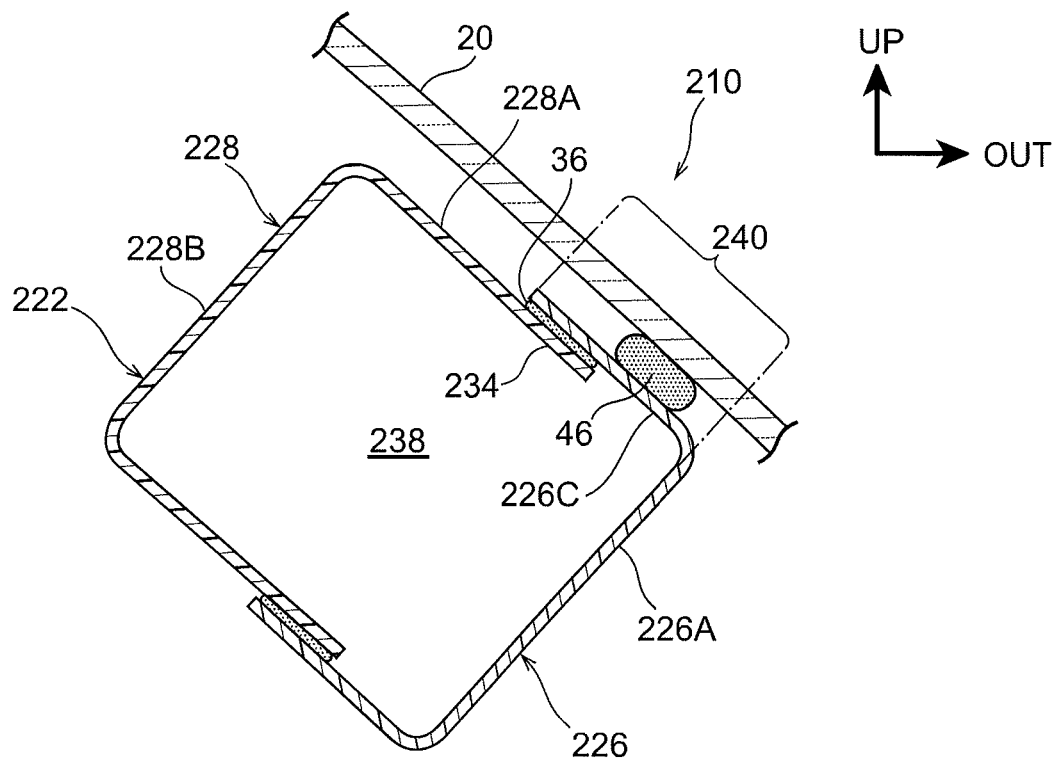
FIG. 5 is a cross-section illustrating a second variation of a structure of a first joint section, and a joint structure of the first joint section and rear window glass, of the frame section illustrated in FIG. 1.

As illustrated in FIG. 5, a variation 2 is configured similarly to the variation 1, with the exception of the following points. In the variation 2, an inner side flange portion 226C is disposed at the vehicle outside (the rear window glass 20 side) of an outer side flange portion 234 at a first joint section 240. The rear window glass 20 is directly joined to the inner side flange portion 226C by the peripheral component adhesive 46. In other words, the rear window glass 20 is only joined to a door inner panel 226. Thus the rear window glass 20 is directly supported by the door inner panel 226 in the variation 2 also, thereby enabling the rear window glass 20 to be stably supported.

In the variation 2, the inner side flange portion 226C is disposed at the vehicle outside (the rear window glass 20 side) of the outer side flange portion 234, thereby enabling an adhesion surface area between the inner side flange portion 226C and the rear window glass 20 to be increased. This enables joint strength between the rear window glass 20 and the door inner panel 226 by the peripheral component adhesive 46 to be increased. Reference numerals 210, 222, 226A, 228, 228A, 228B and 238 represent structures similar to the structures associated with reference numerals 10, 22, 26A, 28, 28A, 28B and 38, respectively, in FIG. 1.

Variation 3

Figure 6:
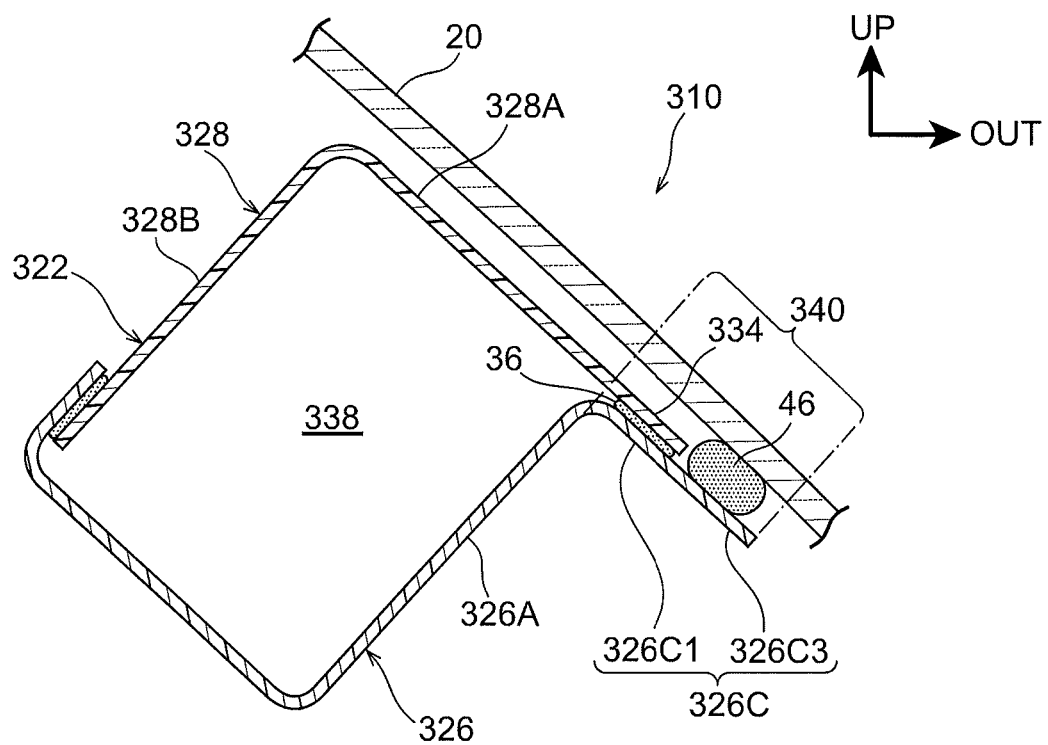
FIG. 6 is a cross-section illustrating a third variation of a structure of a first joint section, and a joint structure of the first joint section and rear window glass, of the frame section illustrated in FIG. 1.

As illustrated in FIG. 6, a variation 3 is configured similarly to the present exemplary embodiment, with the exception of the following points. In the variation 3, the step portion 26C2 is omitted from an inner side flange portion 326C of a door inner panel 326, and an inner side joint portion 326C1 and an extension portion 326C3 are directly joined together. The extension portion 326C3 has a longer extension toward the vehicle width direction outside than in the FIG. 1 exemplary embodiment, and the rear window glass 20 is directly joined to the extension portion 326C3 of the inner side flange portion 326C by the peripheral component adhesive 46. In other words, the rear window glass 20 is only joined to the door inner panel 326. Thus the rear window glass 20 is directly supported by the door inner panel 326 in the variation 3 also, thereby enabling the rear window glass 20 to be stably supported. Reference numerals 310, 322, 326A, 328, 328A, 328B, 334, 338 and 340 represent structures similar to the structures associated with reference numerals 10, 22, 26A, 28, 28A, 28B, 34, 38 and 40, respectively, in FIG. 1.

Variation 4

Figure 7:
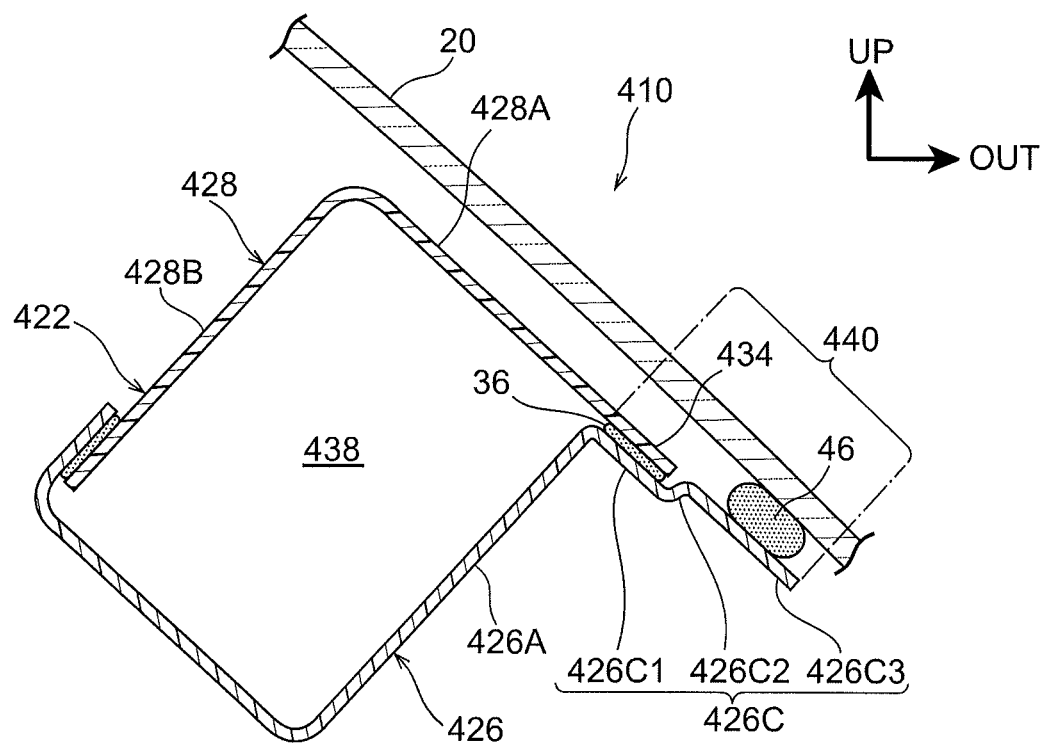
FIG. 7 is a cross-section illustrating a fourth variation of a structure of a first joint section, and a joint structure of the first joint section and rear window glass, of the frame section illustrated in FIG. 1.

As illustrated in FIG. 7, a variation 4 is configured similarly to the FIG. 1 exemplary embodiment, with the exception of the following points. In the variation 4, similarly to in the variation 3, an extension portion 426C3 of an inner side flange portion 426C has a longer extension toward the vehicle width direction outside than in the FIG. 1 exemplary embodiment. The rear window glass 20 is directly joined to the extension portion 426C3 of the inner side flange portion 426C by the peripheral component adhesive 46. In other words, the rear window glass 20 is only joined to a door inner panel 426. Thus the rear window glass 20 is directly supported by the door inner panel 426 in the variation 4 also, thereby enabling the rear window glass 20 to be stably supported. This also enables an adhesion surface area between the rear window glass 20 and the door inner panel 426 to be larger than in the present exemplary embodiment. Reference numerals 410, 422, 426, 426A, 426C1, 426C2, 428, 428A, 428B, 434, 438 and 440 represent structures similar to the structures associated with reference numerals 10, 22, 26, 26A, 26C1, 26C2, 28, 28A, 28B, 34, 38 and 40, respectively, in FIG. 1.

Variation 5

Figure 8:
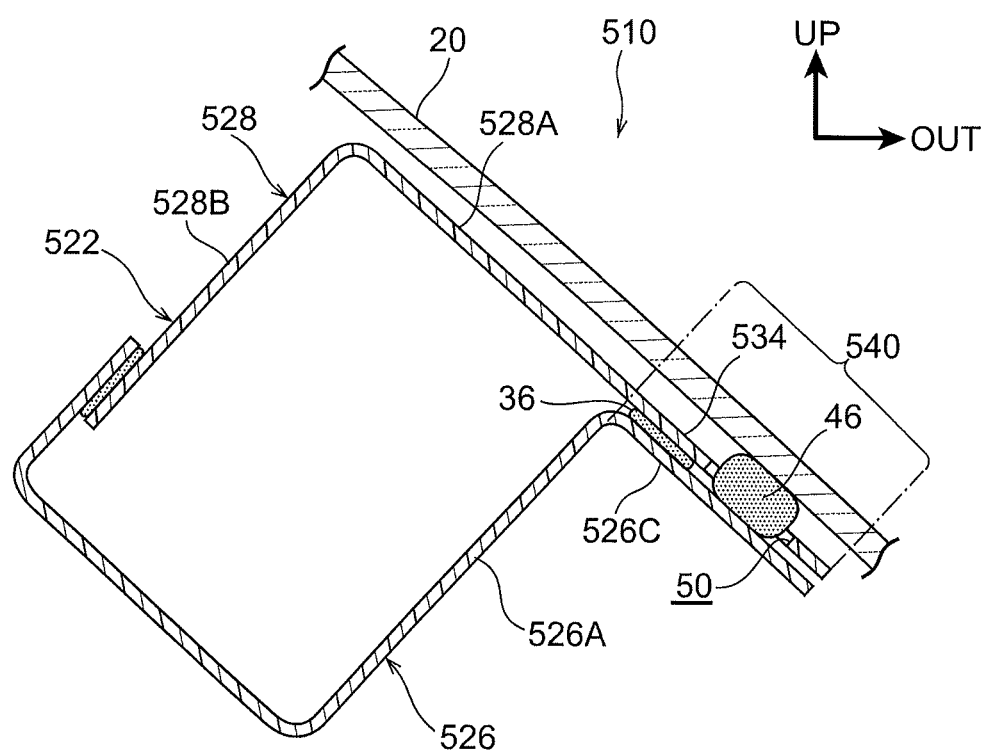
FIG. 8 is a cross-section illustrating a fifth variation of a structure of a first joint section, and a joint structure of the first joint section and rear window glass, of the frame section illustrated in FIG. 1.

As illustrated in FIG. 8, a variation 5 is configured similarly to the variation 3, with the exception of the following points. In the variation 5, a leading end portion of an outer side flange portion 534 of a door outer panel 528 extends as far as an extension portion of an inner side flange portion 526C of a door inner panel 526. In other words, configuration is such that substantially the entire outer side flange portion 534 and substantially the entire inner side flange portion 526C overlap with each other. A hole portion 50 is formed at the outer side flange portion 534, and the inner side flange portion 526C is exposed to the rear window glass 20 side by the hole portion 50. The peripheral component adhesive 46 is disposed inside the hole portion 50, and the rear window glass 20 is directly joined to the inner side flange portion 526C by the peripheral component adhesive 46. In other words, the rear window glass 20 is only joined to the door inner panel 526. Thus the rear window glass 20 is directly supported by the door inner panel 526 in the variation 5 also, thereby enabling the rear window glass 20 to be stably supported. Reference numerals 510, 522, 526A, 528A, 528B and 540 represent structures similar to the structures associated with reference numerals 10, 22, 26A, 28A, 28B and 40, respectively, in FIG. 1.

Variation 6

Figure 9:
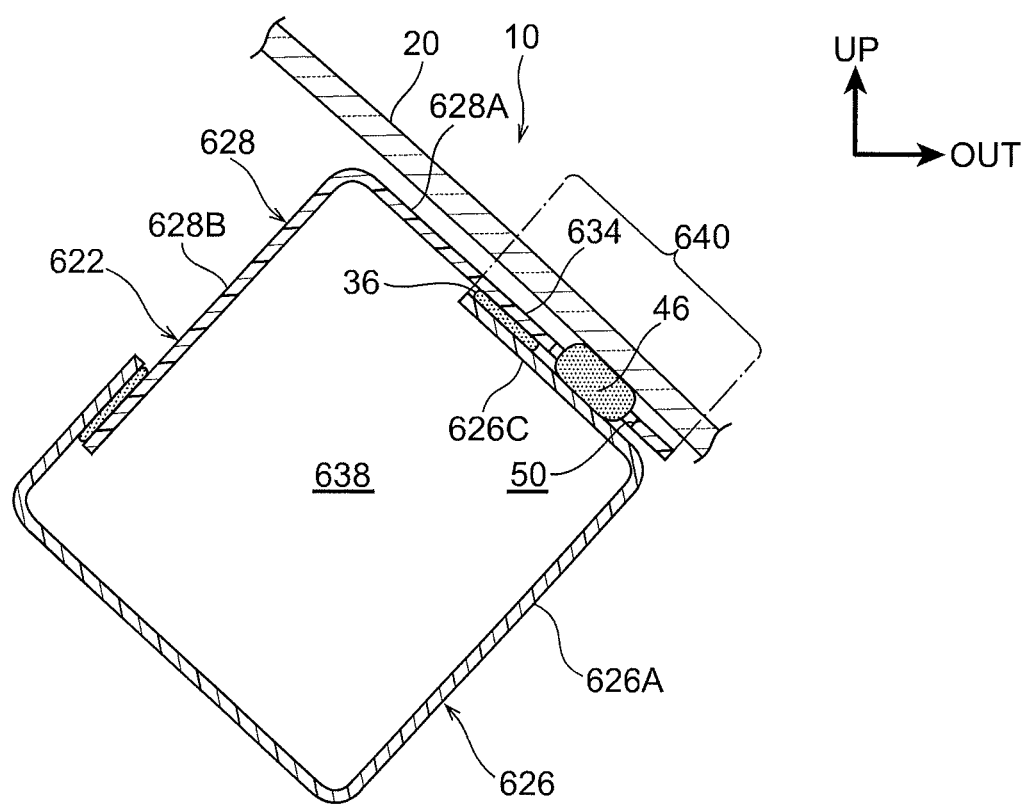
FIG. 9 is a cross-section illustrating a sixth variation of a structure of a first joint section, and a joint structure of the first joint section and rear window glass, of the frame section illustrated in FIG. 1.

As illustrated in FIG. 9, a variation 6 is configured similarly to the variation 1, with the exception of the following points. In the variation 6, a leading end portion of an outer side flange portion 634 of a door outer panel 628 extends as far as a base end side of an inner side flange portion 626C of a door inner panel 626. The hole portion 50 is formed at the outer side flange portion 634, similarly to in the variation 5, and the inner side flange portion 626C is exposed to the rear window glass 20 side by the hole portion 50. The peripheral component adhesive 46 is disposed inside the hole portion 50, and the rear window glass 20 is directly joined to the inner side flange portion 626C by the peripheral component adhesive 46. In other words, the rear window glass 20 is only joined to the door inner panel 626. Thus the rear window glass 20 is directly supported by the door inner panel 626 in the variation 6 also, thereby enabling the rear window glass 20 to be stably supported. Reference numerals 622, 626A, 626B, 628A, 638 and 640 represent structures similar to the structures associated with reference numerals 22, 26A, 26B, 28A, 38 and 40, respectively, in FIG. 1.

In the variation 1 to the variation 6 as described above, the rear window glass 20 is only joined to the door inner panel 26, 126 to 626 by the peripheral component adhesive 46. This enables the position of the rear window glass 20 with respect to the door inner panel 26, 126 to 626 (the inner side flange portion 26C, 126C to 626C) to be made even more stable than in a configuration in which the rear window glass 20 is joined to the door inner panel 26 (inner side flange portion 26C) through the door outer panel 28 (outer side flange portion 34).

Note that in the variation 5 and the variation 6, the peripheral component adhesive 46 may be disposed such that the peripheral component adhesive 46 is joined to a peripheral edge portion of the hole portion 50.

What is claimed is:

1. A vehicular resin back door structure comprising:
   an inner panel that is made of resin and defines a frame of a resin back door that is configured to be supported by a vehicle body so as to be capable of opening and closing, an upper portion of the inner panel having an opening through which a driver can view rearwardly out of a vehicle to which the vehicular resin back door is mounted;
   an outer panel that is made of resin and disposed on a vehicle outer side of the inner panel at a periphery of the opening, the outer panel joined to the inner panel by a first adhesive to form, together with the inner panel, a frame section including an internal chamber;
   a glass sheet that is joined to the inner panel at the frame section by a second adhesive, and that covers the opening; and
   a contact wall that forms part of a portion of the inner panel at the frame section, and that is configured to directly or indirectly contact the vehicle body in a closed state of the vehicular resin back door, wherein
   the frame section comprises (i) a first joint section that is disposed facing the glass sheet and that joins the inner panel and the outer panel together, and (ii) a second joint section that is disposed closer to the opening than the first joint section and that joins the inner panel and the outer panel together, and
   the first joint section and the glass sheet are joined together by the second adhesive.

2. The vehicular resin back door structure of claim 1, wherein the first joint section comprises:
   an inner side flange portion that is provided at the inner panel and extends outwardly of the chamber; and
   an outer side flange portion that is provided at the outer panel, that extends outwardly of the chamber, and that is joined to the inner side flange portion; and
   wherein an extension portion extending further outwardly of the chamber than the outer side flange portion is formed at a portion at a leading end side of the inner side flange portion, and the glass sheet is joined to the extension portion by the second adhesive.

3. The vehicular resin back door structure of claim 1, wherein the first joint section extends parallel to the glass sheet in a cross-section viewed along a length direction of the frame section.

4. The vehicular resin back door structure of claim 1, wherein the second joint section extends along a vehicle up-down direction in a cross-section viewed along a length direction of the frame section.

5. The vehicular resin back door structure of claim 2, wherein the second adhesive is disposed along both side edge portions in a vehicle width direction of the glass sheet, and both end portions in the vehicle width direction of the glass sheet are joined to the inner side flange portion.

6. The vehicular resin back door structure of claim 1, wherein:
   the second adhesive is disposed along an outer peripheral edge portion of the glass sheet around an entire periphery of the glass sheet; and
   an outer peripheral portion of the glass sheet is joined to the inner panel.

7. The vehicular resin back door structure of claim 1, wherein the first joint section comprises:
   an inner side flange portion that is provided at the inner panel and that extends outwardly of the chamber, and
   an outer side flange portion that is provided at the outer panel, that extends outwardly of the chamber, and that is joined to the inner side flange portion; and
   wherein the outer side flange portion has substantially a same length as the inner side flange portion, a hole is formed at the outer side flange portion, the inner side flange portion is exposed to the glass sheet through the hole, the second adhesive is disposed inside the hole, and the glass sheet is joined to the inner side flange portion through the hole.

8. The vehicular resin back door structure of claim 1, wherein the first joint section is provided at an exterior of the chamber of the frame section and extends outwardly in the vehicle width direction.

9. The vehicular resin back door structure of claim 1, wherein the first joint section is provided at the chamber of the frame section and extends inwardly in the vehicle width direction.

* * * * *